United States Patent [19]

Roland

[11] 4,159,801
[45] Jul. 3, 1979

[54] FIREPLACE BOILER

[76] Inventor: Albert E. Roland, Box 198, Stoney Garden Rd., Kintersville, Pa. 18930

[21] Appl. No.: 834,493

[22] Filed: Sep. 19, 1977

[51] Int. Cl.$^2$ ............................................. F24D 3/00
[52] U.S. Cl. .................................... 237/8 R; 126/132
[58] Field of Search ....................... 237/8 R, 51, 62; 126/132, 133

[56] References Cited

U.S. PATENT DOCUMENTS

| 463,061 | 11/1891 | Lewis | 126/132 |
| 1,432,538 | 10/1922 | Armond | 126/132 |
| 2,172,711 | 9/1939 | Newton | 126/132 X |
| 3,315,892 | 4/1967 | Haake | 237/8 |
| 3,958,755 | 5/1976 | Cleer | 126/132 X |
| 4,025,043 | 5/1977 | Cleer | 126/132 X |

FOREIGN PATENT DOCUMENTS

| 400207 | 10/1933 | United Kingdom | 126/132 |
| 983181 | 2/1965 | United Kingdom | 126/132 |

*Primary Examiner*—J. Franklin Foss
*Attorney, Agent, or Firm*—Burns, Doane, Swecker & Mathis

[57] ABSTRACT

A fireplace boiler for heating liquids is disclosed which is adapted to be fitted into a fireplace cavity and combined with a pre-existing domestic heating system. The boiler includes a grate made up of a plurality of heating tubes connected to headers through which a liquid to be heated flows. At one end of the grate is located a vertical sampling tube having an orifice therein through which the liquid flows between the headers. The flow of liquid in the sampling tube is reversible with the direction of flow being dependent upon whether the fluid in the boiler is being circulated through the heating system. The reversible direction of flow enables a temperature sensor located in the sampling tube to accurately sense the temperature of the fluid in the boiler at all times.

16 Claims, 3 Drawing Figures

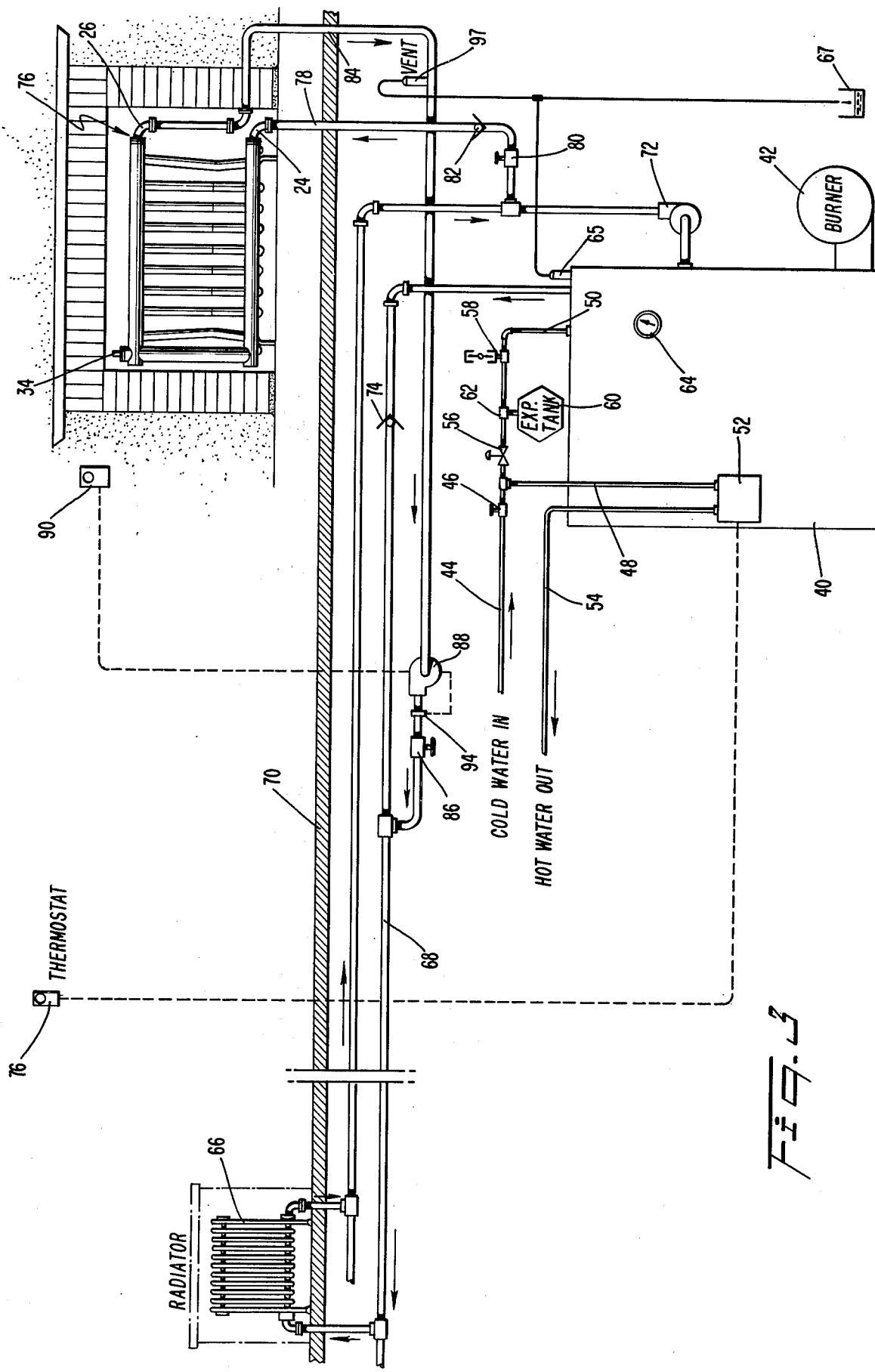

FIREPLACE BOILER

BACKGROUND OF THE INVENTION

The present invention relates to a boiler for heating liquids, and more particularly, a boiler which is adapted to be fitted into a fireplace cavity and combined with a heating system.

In the past, the use of heat generated in a fireplace for heating a liquid which is circulated through a domestic heating system has not met with success. In one prior art device dealing with this subject, illustrated in U.S. Pat. No. 3,958,755 to Cleer, Jr., a water jacket is used which forms the interior walls of a fireplace. The use of a water jacket in a fireplace presents a possible safety hazard. A water jacket possesses large surface areas in contact with the water which renders the jacket inherently weak as a container. As steam pressure builds up within the jacket due to the boiling of the liquid therein by heat from a fire, the walls of the jacket tend to balloon to increase the volume within the jacket. It is apparent that a malfunction of the circulator of the system in which the water jacket is incorporated while a fire is burning in the fireplace could result in the buildup of such pressure in the water jacket that the walls of the jacket would burst and possibly injure persons nearby.

A further problem was encountered with such systems in the past in the control of circulation of liquid in the system in response to liquid temperature. The previously mentioned Cleer, Jr., patent discloses that control of water flow into the water jacket might be responsive to a temperature sensor within the water jacket. However, a temperature sensor which senses liquid temperature at only one point in the water jacket does not sense the average temperature of the water in the jacket, which can lead to periods of instability in circulator operation.

For example, when a fire is first built in the fireplace, the circulator is not operating and the water is stationary in the water jacket. The water is heated up to a predetermined temperature relatively quickly and the circulator is actuated. At this point the fire has not built up to a sufficient size to heat a continuously flowing volume of water to the predetermined temperature and so the circulator is deactuated as soon as the temperature sensor senses the incoming cold water. Again, the stationary water is heated relatively quickly and the circulator is actuated until more cold water is sensed.

This intermittent operation of the circulator continues until the fire has built up to a sufficient size to heat the incoming cold water to at least the predetermined temperature without the need for stopping water flow through the jacket. This period of instability also exists and is of greater duration when the fire dies out due to the lesser rate of temperature decrease in the fireplace than the rate of increase in temperature when the fire is first built. The cost of using a plurality of temperature sensors to determine the average temperature in the water jacket would be excessive.

A further drawback in the use of a water jacket is encountered during installation of the jacket. The water jacket must be designed to fit precisely within the dimensions of the fireplace into which it is to be incorporated. Due to the variations in size of fireplaces, it is not possible to manufacture a water jacket of standard size which is adapted for use with a plurality of different fireplaces. The need for customizing the water jacket to fit a particular fireplace presents an undesirable expense. Furthermore, once fitted and installed, the water jacket is not easily removed from a fireplace should the need or desire to do so arise.

OBJECTS AND SUMMARY OF THE INVENTION

Accordingly, it is an object of the present invention to provide a novel fireplace boiler which presents no potential safety hazard to the occupants of a room in which it is located.

It is another object of the present invention to provide a fireplace boiler having a novel temperature sensing means, utilizing a single temperature sensor, which substantially reduces periods of instability in the control of liquid flow through the boiler.

It is a further object of the present invention to provide a novel fireplace boiler which can be incorporated into a pre-existing conventional hot water heating system and which automatically switches from conventional heating to fireplace heating without the need for manually operated valves or controls.

These and other objects of the invention are achieved by providing a fireplace boiler including structurally rigid grate means in which a fire is built and through which the liquid to be heated flows. The grate means has inlet and outlet ports for connection with a conventional liquid heating system. The boiler further includes a sampling means through which the liquid continuously flows when a fire is present in the grate means. A temperature sensor is included in the sampling means. Due to the continual flow of liquid through the sampling means, the temperature sensed is the mixed or average temperature of the liquid in the boiler rather than the temperature of stationary liquid at a single point. This permits a more steady and accurate control of fluid flow through the fireplace boiler.

In the preferred embodiment of the invention, the structurally rigid grate means is constructed out of a plurality of heating tubes made up of standard boiler tubing. Such tubing is sufficiently strong to withstand the buildup of steam pressure in the fireplace boiler. This presents a measure of safety should the flow of liquid through the boiler be interrupted while a fire is burning.

The heating tubes are configured to enable free convection flow of the liquid between the bottom of the grate means and the outlet port of the fireplace boiler. In the preferred embodiment, they are substantially C-shaped. The heating tubes provide for a continual rise of the liquid between the bottom of the grate means and the outlet port to substantially eliminate air pockets and therefore steam pressure build-up within the boiler.

BRIEF DESCRIPTION OF THE DRAWINGS

FIG. 3 is a partial schematic view of a fireplace boiler incorporated into a conventional liquid heating system.

DESCRIPTION OF THE PREFERRED EMBODIMENT

Figure 1:
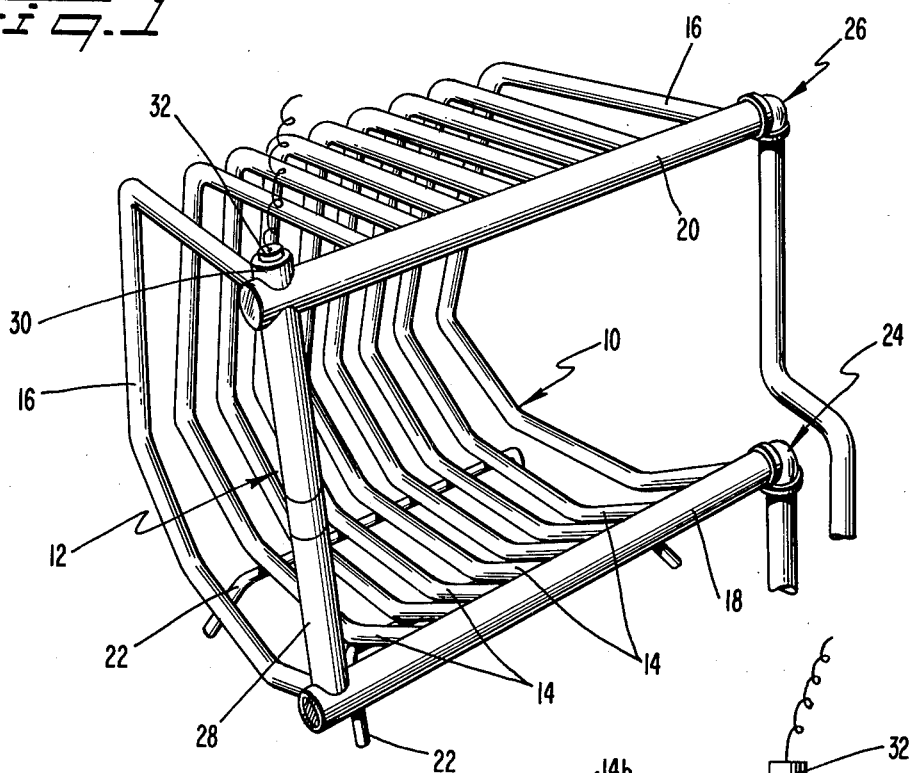
FIG. 1 is a perspective view of the preferred embodiment of the fireplace boiler of the present invention.
Figure 2:
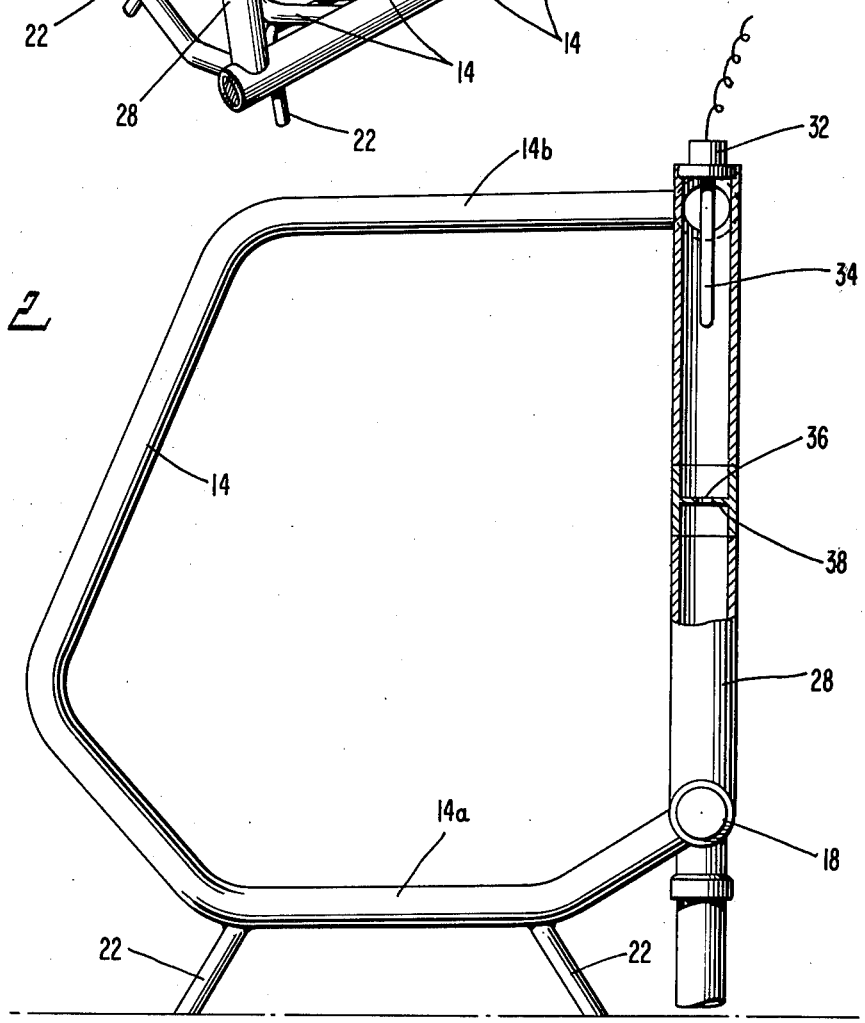
FIG. 2 is a side view of the preferred embodiment of the fireplace boiler.

Depicted in FIGS. 1 and 2 is the preferred embodiment of the fireplace boiler of the present invention. The boiler is designed to fit into a fireplace cavity of standard size. The boiler consists generally of a grate means 10 (FIG. 1) and a sampling means 12. The grate means 10 is adapted to support a plurality of wooden logs on other such similar combustible material for a fire and forms an open structure in which the fire is built.

Referring to FIG. 1, a perspective view of the boiler is illustrated. The grate means 10 comprises an intermediate plurality of heating tubes 14 which lie in vertical planes parallel to one another. As best shown in FIG. 2, each heating tube 14 is substantially C-shaped. At each end side of the intermediate plurality of heating tubes 14 is disposed a converging heating tube 16 which is disposed in a vertical plane non-parallel to the planes of the heating tubes 14. The converging heating tubes 16 are nearer to the parallel heating tubes 14 at the substantially vertical portions of the heating tubes 14, 16 which form the grate means 10. This arrangement of the heating tubes 14, 16 forms, in plan view, a wedge-shaped grate means which is easily fitted into a fireplace cavity. It is apparent that the number of parallel heating tubes 14 which are included in the grate means is dependent upon the size and spacing of the tubes and the overall desired size of the grate means 10.

Each heating tube 14, 16 is connected at its lower end to a lower header 18 and its upper end to an upper header 20. The point of connection of a heating tube 14, 16 to the lower header 18 is at a location on the heating tube at which a liquid can enter or exit the heating tube. In the case of the disclosed embodiment, this location is at the lower end of the substantially C-shaped tube. Likewise, the connecting point of the upper header 20 and the upper end of a heating tube 14, 16 is at a second location at which a liquid can enter or exit the heating tube.

The heating tubes 14, 16 and the headers 18, 20 are constructed out of standard boiler tubing of sufficient thickness to withstand steam pressure buildup due to boiling of liquid (e.g., 600 psig) and dry firing resulting from building a fire in the grate means without a liquid being present in the tubes to carry the heat away. The headers can each be made of 10 gauge tubing having an outside diameter of 2 inches and a wall thickness of 0.034 inch; the heating tubes 14, 16 may each be of 10 gauge tubing having an outside diameter of 1¼ inches and a wall thickness of 0.134 inch. The headers 18, 20 are larger in cross-sectional area and diameter than the heating tubes 14, 16 to allow equal flow of liquid through all of the heating tubes regardless of the distance of a heating tube from the point at which liquid enters or exits a header.

To obtain the most efficient use of heat generated by a fire, the spacing of the heating tubes 14, 16 in the grate means should be greater than or equal to the outside diameter of a heating tube 14, 16 but less than or equal to twice the outside diameter of a heating tube. For the disclosed embodiment, heating tube spacing would be in the range of 1¼ to 2½ inches. Too many heating tubes, i.e., spacing less than the heating tube's outside diameter, restricts the flow of air through the grate means 10 and prevents efficient burning of the combustible material. It may also provide too large a volume of liquid to enable the fire to heat the flowing liquid to a predetermined temperature. On the other hand, spacing of heating tubes 14, 16 greater than twice the outside diameter does not make efficient use of all the heat generated by the fire.

When constructed as disclosed, the heating tubes 14, 16 and the headers 18, 20 form a structurally rigid grate means 10 in which a fire can be built. The grate means 10 is supported a suitable distance above the floor of the fireplace by a plurality of legs 22 to provide access for combustion air. A distance of 5 to 6 inches, for example, provides draft clearance and ample room for coals to accummulate beneath the grate means and yet be sufficiently close enough to continue heating the lower portions of the heating tubes while still hot.

The lower header 18 has an inlet port 24 at one end thereof and the upper header 20 has an outlet port 26 at one end thereof. The inlet and outlet ports form the means by which the fireplace boiler is connected with a conventional liquid heating system, as illustrated in FIG. 3.

At an end of the grate means remote from the end at which the inlet and outlet ports are located, a sampling means 12 interconnects the lower header 18 and the upper header 20. The sampling means 12 includes a straight vertical sampling tube 28 which provides a liquid flow path between the headers 18, 20. The sampling tube 28 is preferably constructed of the same material as the lower and upper headers 18, 20, i.e., boiler tubing having an outside diameter of 2 inches in the disclosed embodiment.

On the upper portion of the upper header 20 above the location at which it is joined to the sampling tube 28 is located a boss 30. The boss 30 is internally threaded and adapted to receive a threaded plug 32 having conforming threads. Preferably, the threads of the plug are tapered as is well-known with pipe threads to provide a tight fit between the plug 32 and the boss 30 as the plug is screwed into the boss. Located within the plug 32 is a temperature sensing bulb 34 (FIG. 2) for sensing the temperature of liquid in the boiler. The bulb 34 is approximately 6 inches in length and extends far enough down into the sampling tube 28 to accurately measure the average temperature of liquid flowing therein. The sensing bulb 34 is preferably one element of a suitable, conventional remote bulb temperature sensing system, one type of which is manufactured by the Honeywell Corporation.

Within the sampling tube 28 is disposed an orifice means 36 for restricting the flow of liquid in the sampling tube. The orifice means 36 is illustrated as being formed by an apertured baffle 36 for restricting the flow of liquid in the sampling tube. The orifice means 36 is illustrated as being formed by an apertured baffle 38 inserted into the sampling tube 28. It will be obvious that other suitable means for restricting the flow of fluid through the sampling tube can be utilized in the context of the present invention. The orifice means 36 is designed to present a greater restriction to fluid flow between the headers 18, 20 than the heating tubes 14, 16. In the disclosed embodiment, the orifice means 36 has a diameter of 1 inch or less with a preferred range of ½ to ¾ inch and an optimum value of approximately ⅝ inch. The specific value of the size of the orifice means 36 is to be chosen so that most of the liquid flowing into the inlet port 24 will be forced to flow through the heating pipes 14, 16 rather than flow directly to the upper header 20 through the sampling tube 28.

The orifice means 36 is illustrated in FIG. 2 as being located approximately at the center of the sampling tube 28. This is the preferred location for the orifice means 36 for ease in manufacturing, i.e., the manufacturer need not be concerned with specific top and bottom ends of the sampling tube 28 when attaching it to the headers 18, 20. The orifice means 36 can be located at any point along the sampling tube 28, however. The only concern is that the orifice means 36 be positioned sufficiently far enough away from the sensing bulb 34 so as not to restrict the flow of liquid around the sensing bulb and possibly distort the measurement of liquid temperature.

Depicted in FIG. 2 is the substantial C-shape of the heating tubes 14, 16 of the preferred embodiment of the fireplace boiler. Each heating tube 14, 16 is attached to the lower header 18 at a first location which is at the lower end of the heating tube. Likewise, each heating tube 14, 16 is attached to the upper header 20 at a second location which is at the upper end of the heating tube. The shape of the heating tubes 14, 16 is designed such that there is a continual rise of liquid in the heating tubes by convection currents between the lowermost portion 14a of the heating tubes and the upper header 20.

This continual rise is accomplished by having the lowermost portion 14a of the heating tubes form the support structure on which the fuel to be burned is placed. Liquid entering the fireplace boiler is first heated in this lowermost portion 14a of the heating tubes. Each subsequent portion of a heating tube 14, 16 in the fluid flow path from the lowermost portion 14a to the upper header 20, including the topmost portion 14b, is upwardly inclined. The upper header 20 is therefore at the highest point of the fireplace boiler which contains liquid.

This design assures that liquid flowing by means of free convection currents in the fireplace boiler continually rises from the lowermost portions 14a of the heating tubes 14, 16 to the upper header 20. This feature substantially eliminates areas in which air or steam pockets can form in the heating tubes 14, 16, thereby reducing the problems of air locks and pressure buildup within the fireplace boiler.

When a fire is present in the grate means 10, the heating tubes 14, 16 and the liquid therein are heated by means of radiation of the heat of the fire and conduction of the heat along the tubes. The uppermost portions 14b of the heating tubes are heated as well by means of air convection currents passing through the spaces between the heating tubes 14, 16. The heating of the lowermost portions 14a of the heating tubes is intensified when live coals begin to drop down through the grate means 10, as those portions of the heating tubes 14, 16 receive heat from all sides.

The operation of the disclosed embodiment of the fireplace boiler in heating and sensing the temperature of a liquid therein will now be explained with reference to FIGS. 1 and 2. When a fire is built in the grate means 10, the heating tubes 14, 16 and the liquid contained therein is heated as previously stated. At this point there is no liquid flow into or out of the inlet and outlet ports 24, 26. The liquid being heated in the heating tubes 14, 16 is continually rising from the lowermost portions 14a of the heating tubes 14, 16 to the upper header 20 by means of free convection currents. Because there is continuous thermal expansion of the liquid in the upper header 20 and drawing of cooler liquid from the lower header 18 due to the convection currents, the heated liquid in the upper header 20 flows down the sampling tube 28 and is mixed with the cooler liquid in the lower header 18.

While there is no liquid flow between the fireplace boiler and the remainder of the heating system into which it is incorporated, a continuous flow and mixing of the liquid within the boiler itself does take place. Thus, the temperature sensing bulb 34 is able to give a more accurate reading of the temperature of the liquid being mixed throughout the fireplace boiler rather than the temperature of the liquid at a single point.

Once a minimum predetermined liquid temperature adequate for domestic heating is sensed, a circulator is actuated and cool liquid begins entering inlet port 24 and the heated liquid exits outlet port 26. At this point, the direction of liquid flow in the sampling tube 28 is reversed, i.e., from the lower header 18 to the upper header 20. The orifice means 36 prevents all of the cool incoming liquid from going directly to the upper header 20 from the lower header 18 through the sampling tube 28 and forces liquid through the heating tubes 14, 16.

Due to radiation from the fire and the restricted rate of flow, the liquid in the sampling tube 28 is heated but not to the same degree as that in the heating tubes 14, 16, and the temperature sensed by the temperature sensing bulb 34 is relatively close to the average temperature of the liquid in the fireplace boiler.

If the house or other environment in which the fireplace boiler is located is heated by a conventional heating system while the fire is building in the grate means 10, the liquid entering the inlet port 24 will be warm when the circulator is actuated. Therefore, if the minimum predetermined temperature for actuation of the circulator is set at the normal temperature of liquid returning from a heated environment, the temperature sensing bulb 34 will continue to sense at least the minimum predetermined temperature. The circulator will remain actuated and the period of instability during the initial increase in heat output of the fire will be greatly reduced.

The only occurrence of some instability in operation of the circulator during the initial buildup of the fire would appear to be when the house is not heated prior to building the fire in the grate means 10. When the circulator is first actuated, the liquid entering the inlet port 24 will be cold. As some of this liquid flows through the lower header 18 and up the sampling tube 28, the temperature sensing bulb 34 will sense the cold temperature. The circulator will be temporarily deactuated and the direction of flow of liquid in the sampling tube will be reversed.

The period of time during which the circulator is intermittently actuated will be dependent upon the temperature of liquid entering the inlet port 24 and the rate at which the fire builds. However, it can be seen that measurement of a mixed liquid temperature when there is no circulation and the average liquid temperature during circulation rather than temperature of the liquid at a single point greatly reduces the frequency of actuation and deactuation of the circulator. This advantage of the present invention is obtained during both the period during which the intensity of heat from the fire increases and the much longer period as the fire dies down during which the temperature in the fireplace decreases at a lesser rate than it initially increased.

One example of the manner in which the disclosed fireplace boiler can be incorporated into a conventional liquid heating system is illustrated in FIG. 3. The conventional system illustrated is a hot water heating system which includes a furnace 40 having an oil burner 42 or similar conventionally fired heat generating device. Cold water to be heated is supplied to the furnace by means of an input supply line 44 having a stop valve 46 therein which enables the water supply to be shut off.

The incoming water is divided between two flow paths 48, 50. The first flow path 48 leads to a heating coil 52. Water heated in the heating coil 52 is directed by means of a supply line 54 to faucets for domestic use.

The second flow path 50 includes a reducing valve 56 and an air release valve 58. Water can be stored in an expansion tank 60 having a gate valve 62 at its input port. Water fed into the furnace 40 through flow path 50 is accummulated in a boiler tank (not shown) in which it is heated. The pressure within the boiler tank is displayed on a gauge 64. A pressure release valve 65 is connected with the boiler tank and provides a safety mechanism in case of excess pressure in the boiler tank. Moisture passing through the pressure relief valve can be directed to a drain 67.

Heated water is fed from the furnace to a radiator 66 located in a room to be heated by means of an outlet conduit means 68. The water convectively heats the room through the radiator 66 and is then returned to the furnace by means of a return conduit means 70 to be reheated. The flow of water through the system is driven by a main circulator 72. A check valve 74 prevents a reverse flow in the system when the main circulator 72 is not operating. Control of the furnace 40, and more specifically the oil burner 42, is regulated by at least one thermostat 76 located in the environmental space to be heated. The main circulator 72 may also be responsive to the thermostat 76.

The fireplace boiler is located in a fireplace cavity 76 in the area to be heated. The inlet port 24 of the fireplace boiler is connected with the return conduit means 70 by means of a fireplace supply line 78. The fireplace supply line 78 includes a gate valve 80 for connecting the inlet port to the return conduit means 70 and regulating the flow of water into the fireplace boiler. The fireplace supply line 78 further includes a check valve 82 to prevent a reverse flow of water through the fireplace boiler from the outlet port 26 to the inlet port 24.

The outlet port 26 of the fireplace boiler is connected with the outlet conduit means 68 by means of a fireplace output line 84. The fireplace output line 84 is connected to the outlet conduit means through a gate valve 86. The gate valves 80, 86 enable the fireplace boiler to be isolated from the remainder of the heating system when the fireplace is not to be used for a substantial period of time and for repair of the fireplace boiler, if necessary.

The flow of water through the fireplace boiler is driven by a secondary circulating means 88. The secondary circulating means 88 is responsive to a temperature sensitive control means which includes a control unit 90. The control unit 90 and the temperature sensing bulb 34 make up the previously mentioned remote bulb temperature sensing system. In response to temperature sensing bulb 34 sensing the minimum predetermined temperature of liquid flowing in the sampling tube 28, the remotely located control unit 90 actuates the circulating means 88. A suitable low amperage circulator, such as a Bell & Gossen pump, enables a thermostatic switch within the control unit 90 to be connected directly in series with the power supply line to the secondary circulating means 88 without the need for relay switches, thereby enhancing the economic attractiveness of the system.

The fireplace output line 84 includes a pressure release valve 92 which is connected with the drain 67 and acts as a safety mechanism in case of malfunction in the secondary circulating means 88. The pressure release valve 92 also acts as a safety means in case of overheating in the fireplace boiler by allowing for thermal expansion.

A pressure switch 94 is included in the fireplace output line 84. This switch is responsive to the pressure of air rather than water in the output line. The pressure switch 94 indicates when the fireplace boiler is not filled with water and deactuates the secondary circulating means 88 if an air is present to prevent the circulating means from burning out.

In the preferred embodiment, the secondary circulating means 88 operates to circulate liquid through the fireplace boiler at a rate of 25 gallons per minute. The minimum predetermined temperature is set on the control unit 90 at 115° F. At this rate, the fireplace boiler is capable of producing heat in the range of 100,000 BTU/hr. during normal operation for domestic heating purposes. While the fireplace boiler is operating, there is no need to utilize the conventional furnace.

The present invention may be embodied in other specific forms without departing from the spirit or essential characteristics thereof. The presently disclosed embodiment is therefore to be considered in all respects as illustrative and not restrictive. The scope of the invention is indicated by the appended claims rather than the foregoing description, and all changes which come within the meaning and range of equivalency of the claims are expressly intended to be embraced therein.

What is claimed is:

1. A fireplace boiler for heating a liquid, which is adapted to be fitted into a fireplace, comprising:
   grate means in which a fire is built, including
      a plurality of heating tubes, each tube having a first location and a second location thereon,
      a first header connected at the first location of each of the heating tubes, said first header having an inlet port at one end thereof, and
      a second header connected at the second location of each of the heating tubes, said second header having an outlet port at one end thereof;
   sampling means connected between said first and second headers for allowing a liquid to flow between the headers; and
   a temperature sensor included in said sampling means for sensing the temperature of the liquid flowing therein.

2. The fireplace boiler of claim 1 wherein said sampling means further includes an orifice for restricting the flow of liquid in the sampling means between said headers.

3. The fireplace boiler of claim 2 wherein said sampling means includes a sampling tube and said first and second headers and said sampling tube have a first cross-sectional area, and said heating tubes have a second cross-sectional area of smaller size than said first cross-sectional area.

4. The fireplace boiler of claim 3 wherein the area of said orifice is smaller than said second cross-sectional area to present a greater restriction to liquid flow than said heating tubes.

5. The fireplace boiler of claim 4 wherein the diameter of said orifice is less than or equal to one inch.

6. The fireplace boiler of claim 1 wherein said heating tubes are substantially C-shaped to cause liquid flowing through said heating tubes from the bottom of said grate means to said second header to continually rise during such flow.

7. The fireplace boiler of claim 1 wherein said inlet and outlet ports are located on one end of said grate means, and said sampling means is located at an end of said grate means remote from said one end.

8. The fireplace boiler of claim 1 wherein said temperature sensor is located at the junction of said sampling means and said second header.

9. The fireplace boiler of claim 1 wherein said sampling means includes a vertically disposed sampling tube, the flow of liquid therein being caused by convection currents created in said grate means when a fire is present.

10. The fireplace boiler of claim 1 wherein the outermost heating tubes on the ends of said grate means converge toward each other to permit said grate means to be wedged into a fireplace cavity.

11. The fireplace boiler of claim 10 wherein the heating tubes other than said outermost converging tubes are parallel with one another.

12. The fireplace boiler of claim 11 wherein the spacing between said heating tubes is greter than or equal to the outside diameter of said heating tubes and less than or equal to twice the outside diameter of said heating tubes.

13. A fireplace boiler for heating a liquid which is adapted to be fitted into a fireplace, comprising:
   grate means in which a fire is built, including
      a plurality of substantially C-shaped heating tubes which are disposed in vertical planes parallel with one another and have a spacing between them which is greater than or equal to the outside diameter of one of the tubes and less than or equal to twice the outside diameter of a tube, each tube having a first location and a second location thereon,
      two substantially C-shaped heating tubes which converge toward one another, one tube being disposed at each extremity of said plurality of parallel heating tubes to form a wedge-shaped grate means which is easily fitted into a fireplace cavity, each of said converging heating tubes having a first location and a second location thereon,
      a first horizontally disposed header connected with each of said heating tubes at its respective first location, said first header having a greater cross-sectional area than the cross-sectional area of any of said heating tubes, said first header having an inlet port at one end thereof in the vicinity of its connection with one of said converging heating tubes, and
      a second horizontally disposed header located vertically above said first header and connected with each of said heating tubes at its respective second location, said second header having a cross-sectional area equal to that of said first header, said second header having an outlet port at one end thereof in the vicinity of its connection with said one converging heating tube; and
   sampling means for sampling the temperature of the liquid in said boiler, including
      a straight vertically disposed sampling tube connected between said first and second headers at an end of said grate means remote from the end at which said inlet and outlet ports are located, said sampling tube having a cross-sectional area equal to that of said headers, said sampling tube providing a path for fluid flow from said first header to said second header when there is a fluid flow into and out of said inlet and outlet ports, respectively, and further providing a path for fluid flow from said second header to said first header when a fire is present in said grate and no fluid flow is present into or out of said inlet and outlet ports,
      temperature sensing means threadably engaged in a boss located at the junction of said second header and said sampling tube, said temperature sensing means extending from the top of said boss down into said sampling tube for sensing the temperature of the liquid flowing in said sampling tube, and
      orifice means located approximately at the center of said sampling tube for restricting the flow of liquid in said sampling tube without restricting the flow of liquid around said temperature sensing means, said orifice means having an area smaller than the cross-sectional area of said heating tubes to thereby present a greater resistance to fluid flow than said heating tubes.

14. In a liquid heating system, said system including a radiator means, means for heating a liquid, an outlet conduit means for connecting said heating means with the radiator means through which a heated liquid passes to the radiator means, and return conduit means for connecting said heating means with the radiator means through which a liquid to be heated is returned to said heating means, an improved fireplace boiler system comprising:
   grate means in which a fire is to be built including
      a plurality of heating tubes, each tube having a first location and a second location thereon at which a liquid can enter or exit the tube,
      a first header connected at the first location of each of said heating tubes, said first header having an inlet port connected with said return conduit means, and
      a second header connected at the second location of each of said heating tubes, said second header having an outlet port connected with said outlet conduit means;
   circulating means connected with at least one of said inlet and outlet ports for causing liquid flowing in said return conduit means to flow through said inlet port and into said grate wherein it is heated and from said grate through said outlet port to said outlet conduit means when said circulating means is actuated;
   sampling means connected between said first and second headers for providing a path for fluid flow from said first header to said second header when said circulating means is actuated and for further providing a path for fluid flow from said second header to said first header when a fire is present in said grate means and said circulating means is not actuated; and
   control means for causing said circulating means to be actuated when the temperature of the liquid flowing in said sampling means reaches a predetermined temperature, said control means including a temperature sensing means located in said sampling means for sensing the temperature of the liquid flowing therein.

15. The heating system of claim 14 wherein said control means includes a control unit, said control unit being remotely located from said temperature sensing means.

16. The heating system of claim 14 further including an orifice located in said sampling means for restricting the flow of fluid in the sampling means between said headers.